United States Patent [19]

Hiraoka et al.

[11] Patent Number: 4,977,865
[45] Date of Patent: Dec. 18, 1990

[54] INTAKE SYSTEM FOR V-TYPE ENGINE

[75] Inventors: Tetsuo Hiraoka; Takenori Ohtsuka; Kazuaki Hokazono; Shinji Seike; Tomohiro Sunada, all of Hiroshima, Japan

[73] Assignee: Mazda Motor Corporation, Hiroshima, Japan

[21] Appl. No.: 423,205

[22] Filed: Oct. 18, 1989

[30] Foreign Application Priority Data

Oct. 19, 1988 [JP] Japan ................................. 63-263319
Jun. 20, 1989 [JP] Japan ................................. 1-155712

[51] Int. Cl.$^5$ ........................................... F02M 35/10
[52] U.S. Cl. ............................................. 123/52 MB
[58] Field of Search ......... 123/52 M, 52 MV, 52 MB, 123/52 MC

[56] References Cited

U.S. PATENT DOCUMENTS 4,727,829 3/1988 Kondo et al. .................. 123/52 MB
4,765,285 8/1988 Kobayashi ..................... 123/52 MB

FOREIGN PATENT DOCUMENTS

0276773 8/1988 European Pat. Off. ......... 123/52 M
60-164619 8/1985 Japan .
62-162723 7/1987 Japan .
2202276 9/1988 United Kingdom .......... 123/52 MB

Primary Examiner—David A. Okonsky
Attorney, Agent, or Firm—Sixbey, Friedman, Leedom & Ferguson

[57] ABSTRACT

A V-type engine has a plurality of cylinders formed in a pair of cylinder banks. An intake system for the V-type engine includes a surge tank which is communicated with the atmosphere through a common intake passage provided with a throttle valve, discrete intake passages which branch off from the surge tank and are connected to the responsive cylinders, branch passages which branch off from the respective discrete intake passages, one or more volume chambers each of which is communicated with at least two of the branch passages, on-off valves which are respectively provided in the branch passages and are opened and closed according to the operating conditions of the engine. The surge tank is disposed above one of the cylinder banks and the volume chamber or volume chambers are disposed above the other cylinder bank.

13 Claims, 12 Drawing Sheets

| ENGINE SPEED (rpm) | | | N₁ 3500 | N₂ 5000 | N₃ 7000 | |
|---|---|---|---|---|---|---|
| 1st ON-OFF VALVE | TVO ≥ 73° | CLOSE | OPEN | OPEN | CLOSE |
| | TVO < 73° | OPEN | OPEN | OPEN | OPEN |
| 2nd ON-OFF VALVE | — | CLOSE | CLOSE | OPEN | OPEN |

INTAKE SYSTEM FOR V-TYPE ENGINE

BACKGROUND OF THE INVENTION

1. Field of the Invention

This invention relates to an intake system for a V-type engine, and more particularly to an intake system for a V- type engine which supercharges the engine by kinetic effect of intake air.

2. Description of the Prior Art

As disclosed, for instance, in Japanese Unexamined Pat. Publication Nos. 62(1987)-91621, 62(1987)-162723 and 63(1988)-263319, and U.S. Pat. No. 4649871, there has been known an intake system for an internal combustion engine which is arranged to supercharge the engine by inertia effect of intake air. In such an inertia supercharging intake system, the engine speed range in which the inertia supercharging effect can be obtained depends upon the length of the intake passage between the intake port of each cylinder and the portion at which the pressure wave generated at the intake port and propagated away from the intake port is reflected toward the intake port. Accordingly, in order to obtain the inertia supercharging effect in a wider engine speed range, the effective length between the intake port and the pressure wave reflecting portion, which is generally in the form of an enlarged volume chamber, must be changed with the engine speed. For example, when a pair of enlarged volume chambers are provided at different distances from the intake port and the intake passage upstream of the intake port is selectively communicated with one of the enlarged volume chambers according to the engine speed, the inertia supercharging effect can be obtained in a wider engine speed range. However, this approach gives rise to a problem that the intake system is apt to be complicated and cumbersome. This problem is especially serious in the case of a V-type engine.

SUMMARY OF THE INVENTION

In view of the foregoing observations and description, the primary object of the present invention is to provide an intake system for a V-type engine which has a pair of pressure wave reflecting portions at different distances from the intake ports of the engine and nevertheless can be compactly arranged.

In accordance with the present invention, there is provided an intake system for a V-type engine having a plurality of cylinders formed in a pair of cylinder banks comprising a first volume chamber which is communicated with the atmosphere through a common intake passage provided with a throttle valve, discrete intake passages which branch off from the surge tank and are connected to the respective cylinders, branch passages which branch off from the respective discrete intake passages, one or more second volume chambers each of which is communicated with at least two of the branch passages, on-off valves which are respectively provided in the branch passages and are opened and closed according to the operating condition of the engine, said first volume chamber being disposed above one of the cylinder banks and said second volume chamber or second volume chambers being disposed above the other cylinder bank.

DESCRIPTION OF THE PREFERRED EMBODIMENT

Figure 1:
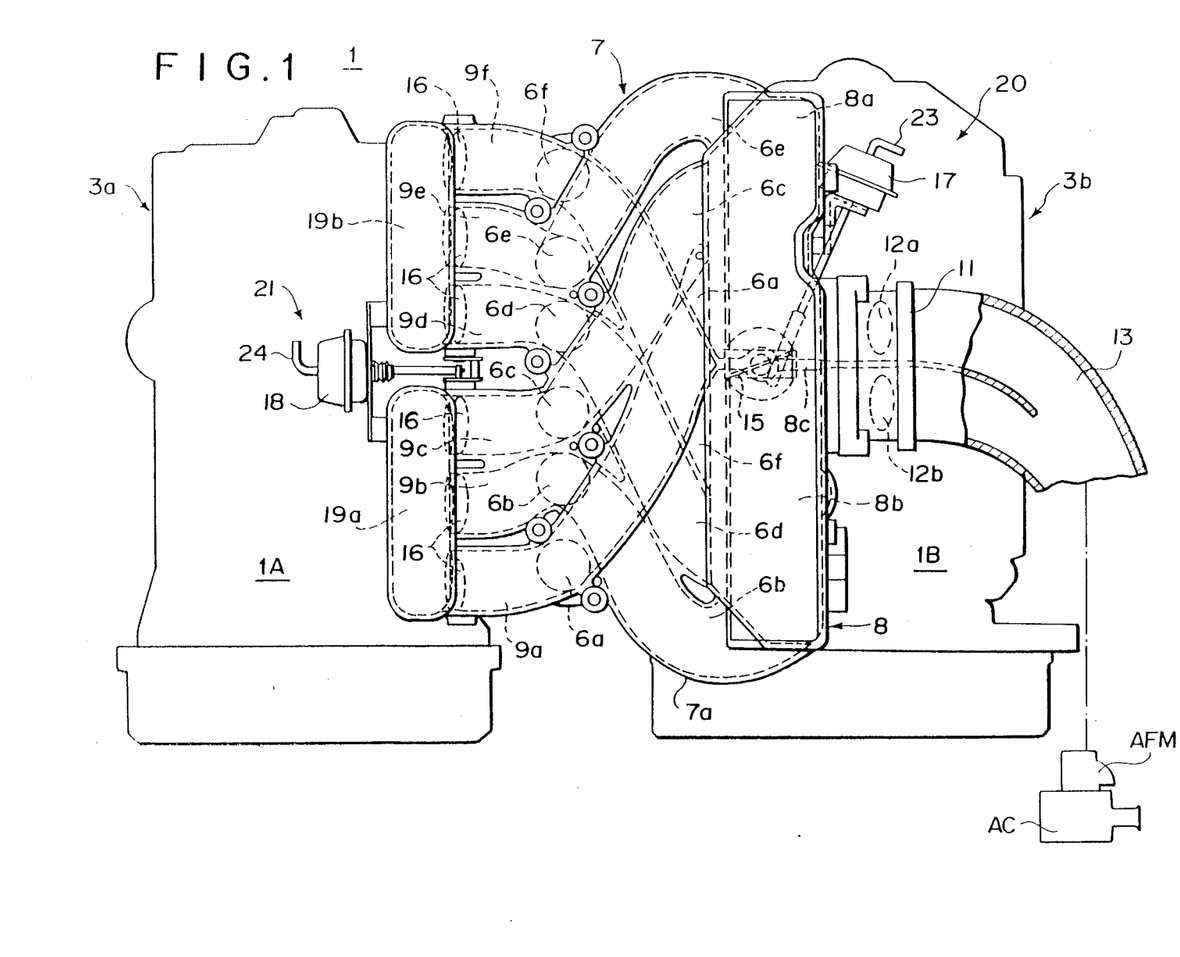
FIG. 1 is a schematic plan view showing a V-6 engine provided with an intake system in accordance with a first embodiment of the present invention.
Figure 2:
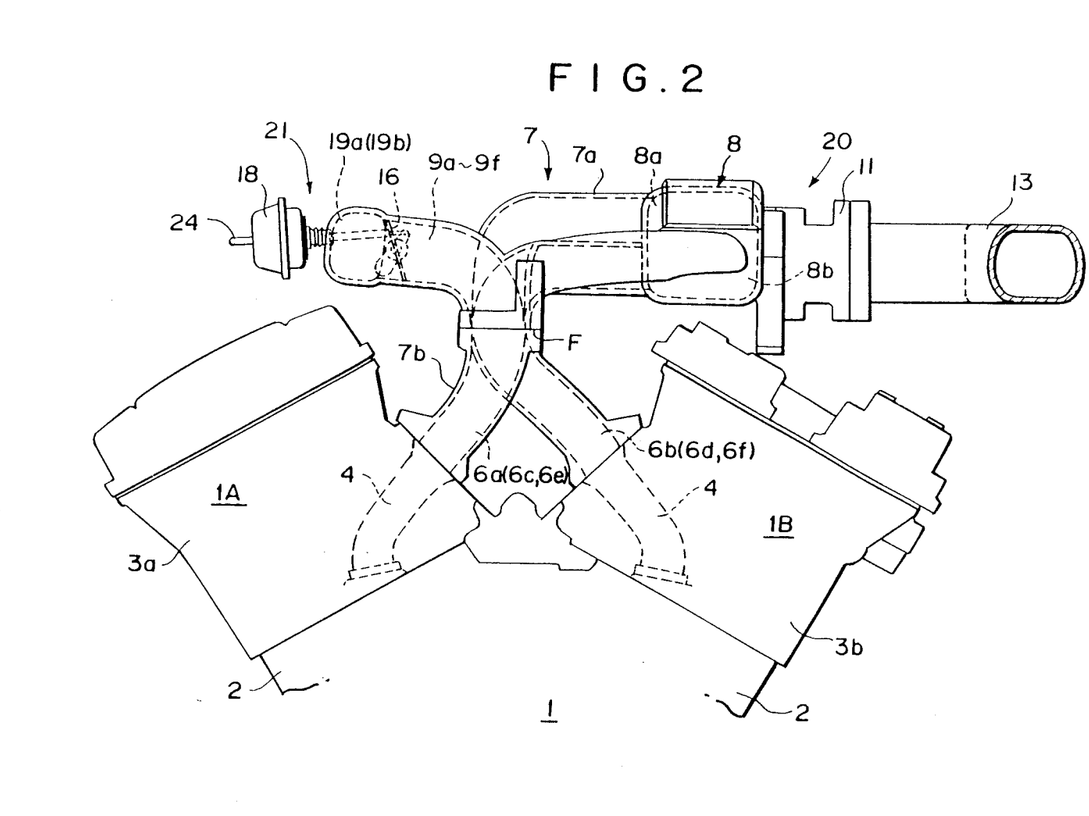
FIG. 2 is a fragmentary front view of the engine.

In FIGS. 1 and 2, a V-6 engine 1 provided with an intake system in accordance with a first embodiment of the present invention comprises left and right cylinder banks 1A and 1B formed by a cylinder block 2 and left and right cylinder heads 3a and 3b mounted on the cylinder block 2 at an angle to each other. Numbers 1, 3 and 5 cylinders are formed in the left cylinder bank 1A and numbers 2, 4 and 6 cylinders are formed in the right cylinder bank 1B. The intake ports 4 of the cylinders in each cylinder bank open in the inner surface of the cylinder bank opposed to the intake ports 4 of the cylinders in the other cylinder bank.

The intake system of this embodiment includes an intake manifold 6 which forms discrete intake passages 6a to 6f respectively connected to the intake ports 4 for the numbers 1 to 6 cylinders, and a surge tank 8 to which the upstream ends of the discrete intake passages 6a to 6f are connected.

The surge tank 8 is disposed above the right cylinder bank 1B, and has first and second chambers 8a and 8b. That is, the surge tank 8 is in the form of an elongated box extending in the direction of the crankshaft and the inside of the surge tank 8 is divided into the first and second chambers 8a and 8b by a partition wall 8c. The first chamber 8a is in the rear of the second chamber 8b. The discrete intake passages 6a, 6c and 6e for the cylinders in the left cylinder bank 1A which is remote from the surge tank 8 are connected to the first chamber 8a, and the discrete intake passages 6b, 6d and 6f for the cylinders in the right cylinder bank 1B are connected to the second chamber 8b. That is, the intake strokes do not occur successively in the cylinders connected to each chamber.

A throttle body 11 is connected to the surge tank 8 on the side opposite to the discrete intake passages 6a to 6f. The throttle body 11 has a pair of passages which are respectively communicated with the first and second chambers 8a and 8b and throttle valves 12a and 12b are provided in the respective passages. A common intake passage 13 is connected to the throttle body 11 and the first and second chambers 8a and 8b of the surge tank 8 are communicated with each other in the common intake passage 13. The upstream end of the common intake passage 13 is connected to an airflow meter AFM and an air cleaner AC.

The intake manifold 7 which forms the discrete intake passages 6a to 6f is formed of upper and lower halves 7a and 7b. The upper half 7a forms the upstream side portion of the discrete intake passages 6a to 6f and is integral with the surge tank 8, and the lower half 7b forms the downstream side portion of the discrete intake passages 6a to 6f. The upper and lower halves 7a and 7b are connected together along a joint surface F which is disposed up the space between the cylinder banks 1A and 1B and is substantially horizontal.

In the lower half 7b, the discrete intake passages 6a, 6c and 6e which are connected to the left cylinder bank 1A obliquely extend upward toward the middle of the space between the cylinder banks 1A and 1B, and in the upper half 7a, they extend upward and then are gently bent rearward and connected to the first chamber 8a of the surge tank 8 which is disposed above the right cylinder bank 1B. In the lower half 7b, the discrete intake passages 6b, 6d and 6f which are connected to the right cylinder bank 1B obliquely extend upward toward the middle of the space between the cylinder banks 1A and 1B, and in the upper half 7a, they extend upward and then are gently bent forward and connected to the second chamber 8b of the surge tank 8 which is disposed above the right cylinder bank 1B. In the joint surface F, the discrete intake passages connected to the left cylinder bank 1A and those connected to the right cylinder bank 1B are alternately arranged in the direction of the crankshaft. The lengths of the discrete intake passages 6a to 6f are substantially equal to each other.

A first on-off valve 15 is provided in an opening which is formed in the partition wall 8c of the surge tank 8 and communicates the first and second chambers 8a and 8b. The first on-off valve 15 is opened and closed by a first actuator 17 and the purpose of the first on-off valve 15 will become apparent later.

A branch passages 9a to 9f branch off from the respective discrete intake passages 6a to 6f in the upper half 7a of the intake manifold 7 and extend toward the left cylinder bank 1A. First and second volume chambers 19a and 19b are disposed above the left cylinder bank 1A with the first volume chamber 19a being forward of the second volume chamber 19b. The branch passages 9a to 9c which branch off from the discrete intake passages 6a to 6c for the numbers 1 to 3 cylinders are connected to the first volume chamber 19a and the branch passages 9d to 9f which branch off from the discrete intake passages 6d to 6f for the numbers 1 to 3 cylinders are connected to the second volume chamber 19b. The discrete intake passages connected to each of the volume chambers 19a and 19b are communicated with each other by way of the volume chamber. Each of the branch passages 9a to 9f is provided with a second on-off valve 16 at its junction to the volume chamber. The second on-off valves 16 in the branch passages connected to each of the volume chambers are supported by a common shaft, and all the second on-off valves 16 are actuated by a second actuator 18. The purpose of the second on-off valves 16 will be come apparent later.

In this particular embodiment, the engine 1 is supercharged by both the interia supercharging effect and the resonance supercharging effect. The resonance supercharging effect is obtained when the natural frequency of the intake system consisting of each of the chambers 8a and 8b of the surge tank 8 and the discrete intake passages connected thereto comes to resonate with the engine speed and to generate a stationary pressure wave and the stationary pressure wave acts on the intake ports 4 at the end of the intake stroke. When the first actuator 17 opens the first on-off valve 15, the first and second chambers 8a and 8b are communicated through a shorter path, thereby increasing the natural frequency of the aforesaid intake system and the resonance supercharging effect is obtained in a higher engine speed range than when the first on-off valve 15 is closed. That is, the first on-off valve 15 and the first actuator 17 form a resonance changing mechanism 20 which changes the engine speed range in which the resonance supercharging effect can be obtained. In this embodiment, the intake stroke occurs in the numbers 1 to 6 cylinders in this order (that is, the firing order is 1-2-3-4-5-6), and the intakes strokes in the cylinders connected to each of the chambers 8a and 8b of the surge tank 8 do not occur successively. Accordingly, the intake air interference does not occur and the resonance supercharging effect can be surely obtained.

The vibrating force generated at each intake port 4 propagate upstream the corresponding discrete intake passage, and vibrates the air in the part of the intake passage between the intake port 4 and the surge tank 8 when the second on-off valve 16 is closed, and vibrates the air in the part of the intake passage between the intake port 4 and the volume chamber 19a or 19b connected to the discrete intake passage when the second on-off valve 16 is opened. When the vibration of the air in the part of the intake passage tunes to the closure of the intake port 4, the inertia supercharging effect can be obtained. When the second on-off valve 16 is closed, the part of the intake passage which participates the vibration is longer than that when the second on- off valve 16 is opened, and the inertia supercharging effect is obtained in a lower engine speed range. That is, the second on-off valve 16 and the second actuator 18 form an inertia changing mechanism 21 which changes the engine speed range in which the inertia supercharging effect can be obtained. Further, when the second on-off valves 16 are opened, intake air is introduced into each cylinder from the discrete intake passages for the other cylinders through the branch passages and the volume chamber 19a or 19b, whereby the intake resistance is reduced and the volumetric efficiency is improved.

Figure 3:
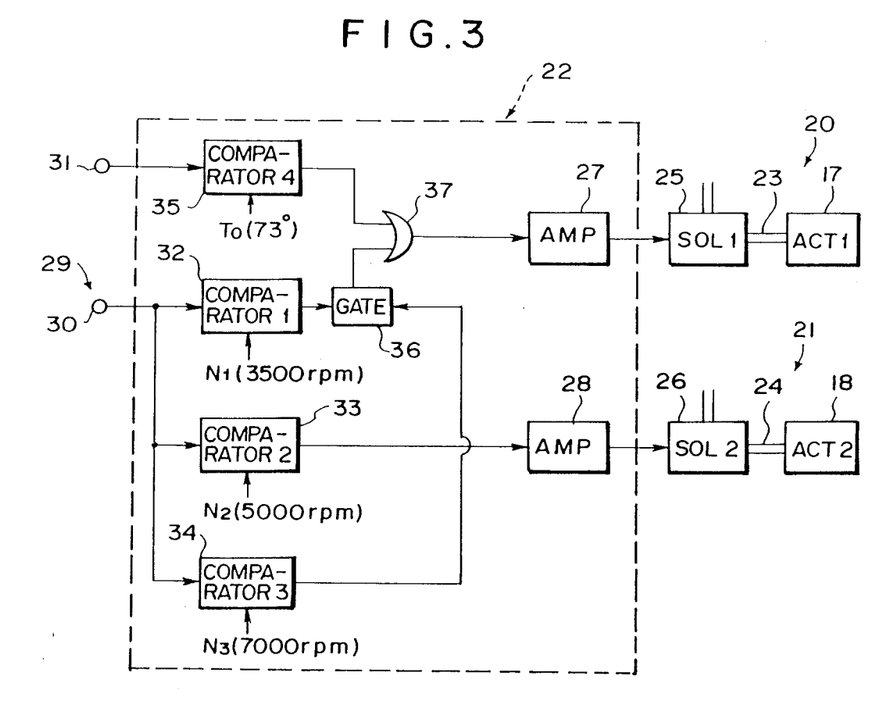
FIG. 3 is a block diagram for illustrating the controller.

The resonance changing mechanism 20 and the inertia changing mechanism 21 are controlled by a controller 22 shown in FIG. 3.

The first actuator 17 is driven by a negative pressure applied thereto through a negative pressure introduction passage 23 which is provided with a first three-way solenoid valve 25, and the second actuator 18 is driven by a negative pressure applied thereto through a negative pressure introduction passage 24 which is provided with a second three-way solenoid valve 26. The controller 22 has a pair of driving circuits 27 and 28 which respectively output driving signals to the first and second three-way solenoid valves 25 and 26 at predetermined times so that negative pressure is applied to the first and second actuators 17 and 18.

An engine speed signal from an rpm sensor 30 of an engine speed detecting means 29 and a throttle opening signal from a throttle sensor 31 which detects the openings of the throttle valves 12a and 12b are input into the controller 22. The engine speed signal is input into first to third comparators 32 to 34 and the throttle opening signal is input into a fourth comparator 35. The first comparator 32 compares the engine speed signal with a first reference value N1 which corresponds to 3500rpm, the second comparator 33 compares the engine speed signal with a second reference value N2 corresponding to 5000rpm, the third comparator 34 compares the engine speed signal with a third reference value corresponding to 7000rpm, and the fourth comparator 35 compares the throttle opening signal with a fourth reference value To corresponding to 73°. The outputs of the first and third comparators 32 and 35 are input into an OR circuit 37 by way of a gate circuit 36. The output of the fourth comparator 35 is also input into the OR circuit 37. The output of the OR circuit 37 is input into the driving circuit 27 which drives the first solenoid valves 25 of the resonance changing mechanism 20. The output of the second comparator 33 is input into the driving circuit 28 which drives the second solenoid valve 26 of the inertia changing mechanism 21.

Figure 4:
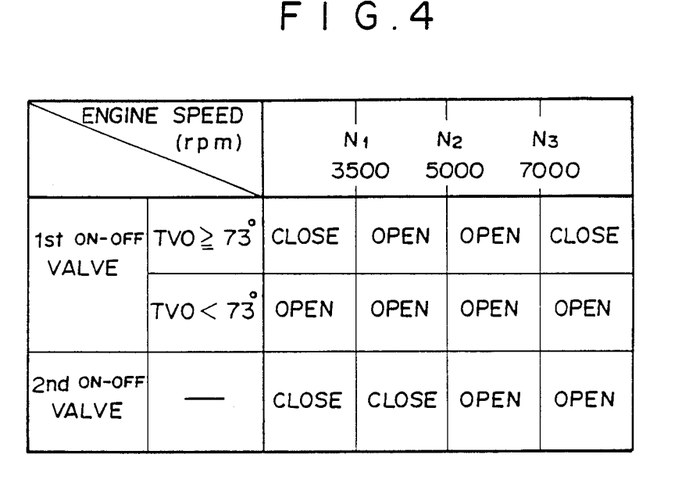
FIG. 4 shows the timing at which the first and second on-off valves are opened or closed.

The controller 22 causes the resonance changing mechanism 20 and the inertia changing mechanism 21 to open and close the first and second on-off valves 15 and 16 in the pattern shown in FIG. 4. That is, the first on-off valve 15 is closed in a heavy load, low engine speed range where the throttle opening is not smaller than 73° and the engine speed is not higher than 3500rpm, and in a heavy load, high engine speed range where the throttle opening is not smaller than 73° and the engine speed is not lower than 7000rpm. In the other ranges, the first on-off valve 15 is opened. The second on-off valve 16 is closed irrespective of the throttle opening when the engine speed is not higher than 5000rpm, and is opened when the engine speed is higher than 5000rpm.

Figure 5:
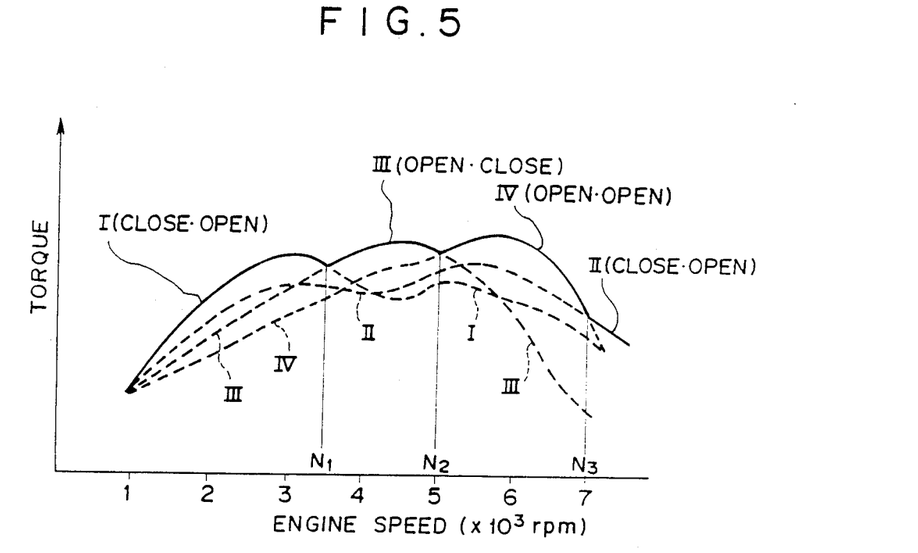
FIG. 5 shows the engine output torque properties obtained by the intake system of the first embodiment.

When the first and second on-off valves 15 and 16 are opened and closed in this pattern, the engine output properties shown in FIG. 5 can be obtained. In FIG. 5, curve I shows the relation between the engine speed and the engine output torque when both the first and second on-off valves 15 and 16 are kept closed over the entire engine speed range. Curve II shows the relation between the engine speed and the engine output torque when the first on-off valve 15 is kept closed and the second on-off valve 16 is kept open over the entire engine speed range. Curve III shows the relation between the engine speed and the engine output torque when the first on-off valve 15 is kept open and the second on-off valve 16 is kept closed over the entire engine speed range. Curve IV shows the relation between the engine speed and the engine output torque when both the first and second on-off valves 15 and 16 are kept open over the entire engine speed range. As can be understood from FIG. 5, a maximum engine output torque can be obtained in the low engine speed range below 3500rpm when the first and second on-off valves 15 and 16 are both closed. In the intermediate engine speed range between 3500rpm and 5000rpm, a maximum engine output torque can be obtained when the first on-off valve 15 is opened and the second on-off valve 16 is closed, and in the high engine speed range between 5000rpm and 7000rpm, a maximum engine output torque can be obtained when the first and second on-off valves 15 and 16 are both opened. Further, in the engine speed range higher than 7000rpm, a maximum engine output torque can be obtained when the first on-off valve 15 is closed and the second on-off valve 16 is opened. Accordingly, when the first and second on-off valves 15 and 16 are closed and opened in the pattern shown in FIG. 4, the engine output torque properties shown by the solid line in FIG. 5 can be obtained.

Since the engine output torque need not be so high in the light load range where the throttle opening is smaller than 73°, the first on-off valve 15 is kept closed over the entire engine speed range so that the engine output torque shown by Curve III is obtained when the engine speed is lower than 5000rpm. That is, when the throttle opening is smaller than 73°, neither the first on-off valve 15 nor the second on-off valve 16 is switched in the engine speed range below 5000rpm, whereby the torque shock produced in response to switching of the valves can be avoided. In the case of a vehicle whose usual operating engine speed range is lower than 7000rpm, the first on-off valve 15 need not be switched at 7000rpm.

In accordance with this embodiment, the volumetric efficiency of the engine can be improved and the engine output torque can be increased over a wide engine speed range by the inertia supercharging effect or the resonance supercharging effect without use of any supercharger.

Figure 6:
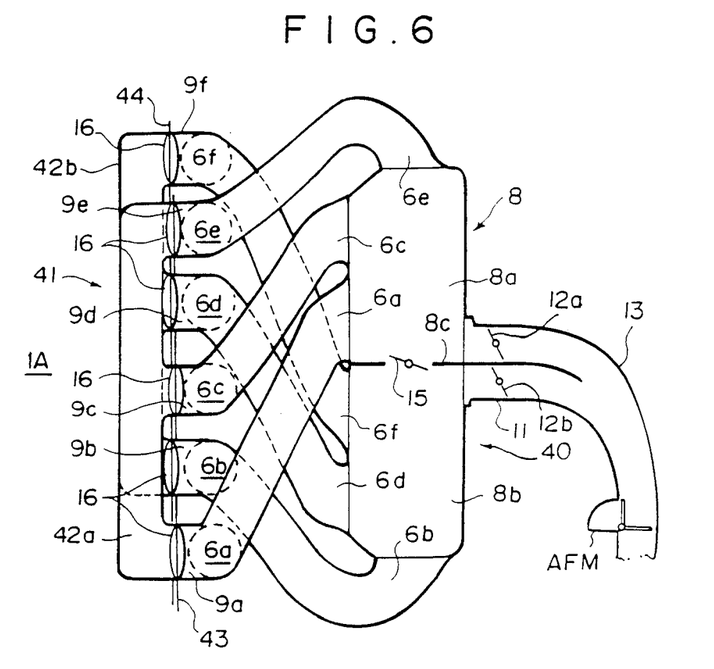
FIG. 6 is a schematic plan view of an intake system in accordance with a second embodiment of the present invention.
Figure 7:
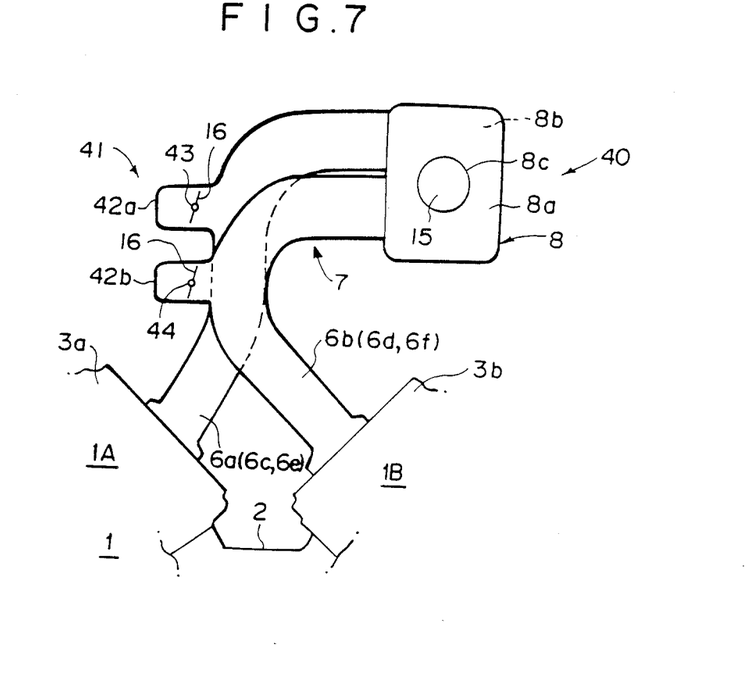
FIG. 7 is a fragmentary front view of the intake system.

FIGS. 6 and 7 show an intake system in accordance with a second embodiment of the present invention. In FIGS. 6 and 7, the parts analogous to the parts shown in FIGS. 1 and 2 are given the same reference numerals and will not be described here.

Similarly to the first embodiment, the discrete intake passages 6a, 6c and 6e for the cylinders in the left cylinder bank 1A are connected to the first chamber 8a of the surge tank 8, and the discrete intake passages 6b, 6d and 6f for the cylinders in the right cylinder bank 1B are connected to the second chamber 8b. The chambers 8a and 8b are communicated by the opening 8c which is closed and opened by the first on-off valve 15 of a resonance changing mechanism 40.

The discrete intake passages 6a to 6f are arranged in a row in the space between the left and right cylinder banks 1A and 1B, and the branch passages 9a and 9f branch off respectively from the discrete intake passages 6a to 6f. The branch passages which branch off from the discrete intake passages for the cylinders in the left cylinder bank 1A are connected to a first volume chamber 42a, and the branch passages which branch off from the discrete intake passages for the cylinders in the right cylinder bank 1B are connected to a second volume chamber 42b which is disposed below the first volume chamber 42a. The branch passages 9a to 9f are respectively provided with the second on-off valves 16. The second on-off valves 16 for the branch passages 9a, 9c and 9e connected to the first volume chamber 42a are supported on a first shaft 43 and are integrally closed and opened. The second on-off valves 16 for the branch passages 9b, 9d and 9f connected to the second volume chamber 42b are supported on a second shaft 44 and are integrally closed and opened. A second actuator (not shown) which forms together with the second on-off valves 16 an inertia changing mechanism 41 is connected to each of the shafts 43 and 44, and opens and closes the second on-off valves 16.

The first and second on-off valves 15 and 16 are opened and closed in the same manner as in the first embodiment.

In this embodiment, the intake stroke does not occur successively in the cylinders communicated with each of the first and second volume chambers 42a and 42b and when one of the cylinders communicated with each of the first and second volume chambers 42a and 42b is in the intake stroke, air is not introduced into the other cylinders. Accordingly, when the second on-off valves 16 are opened in the high engine speed range (5000 to 7000rpm), air flows into the cylinders in the intake stroke from the discrete intake passages for the other cylinders, whereby the volumetric efficiency can be improved better than in the first embodiment.

Figure 8:
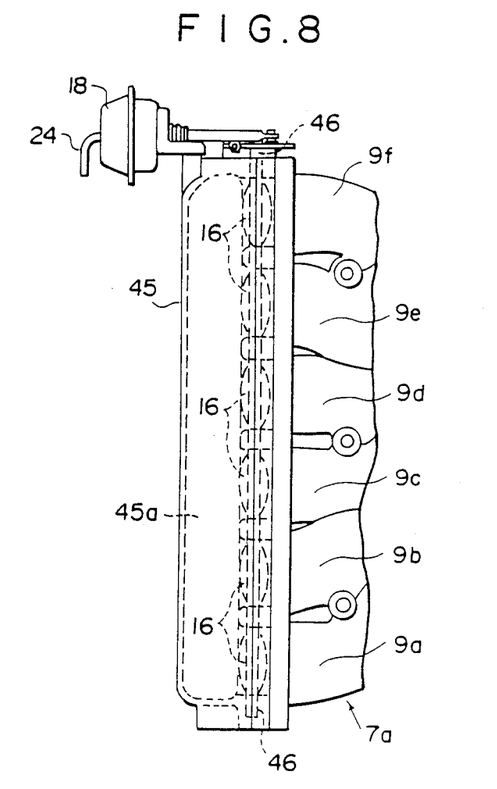
FIG. 8 is a fragmentary plan view for illustrating a modification of the first embodiment.
Figure 9:
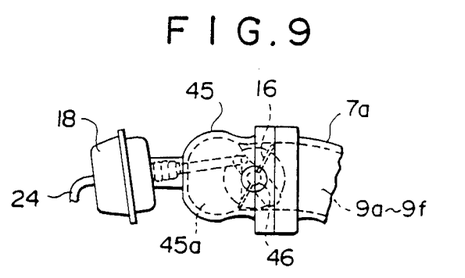
FIG. 9 is a front view of for illustrating the modification.
Figure 10:
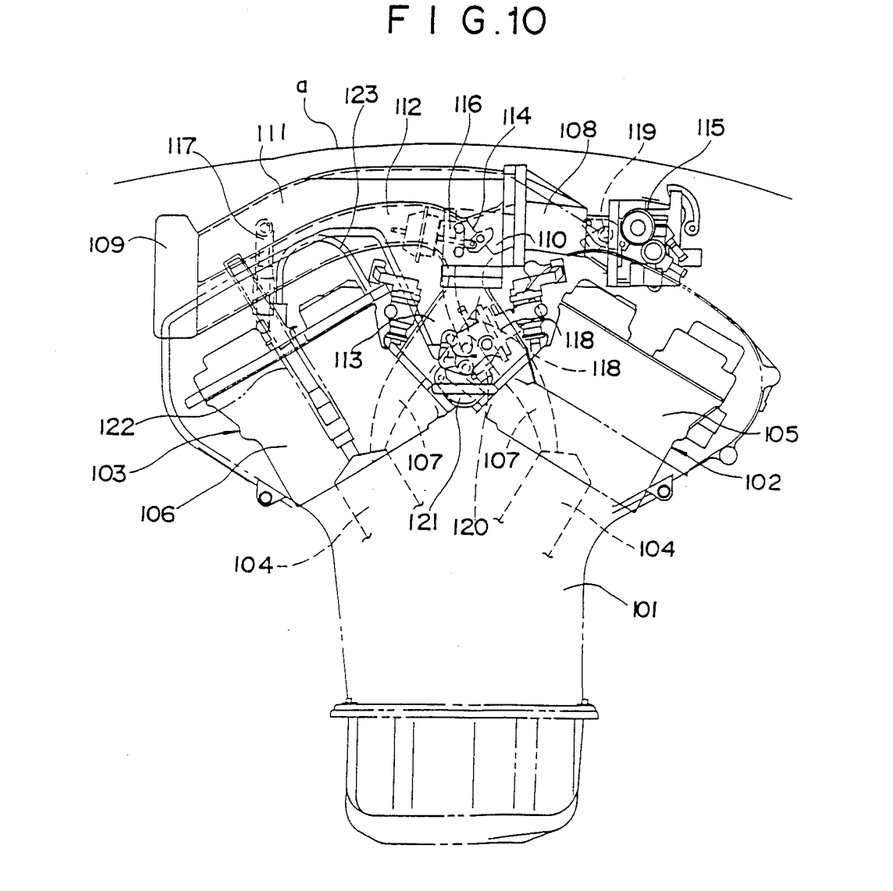
FIG. 10 is a front view of a V-6 engine provided with an intake system in accordance with a third embodiment of the present invention.
Figure 11:
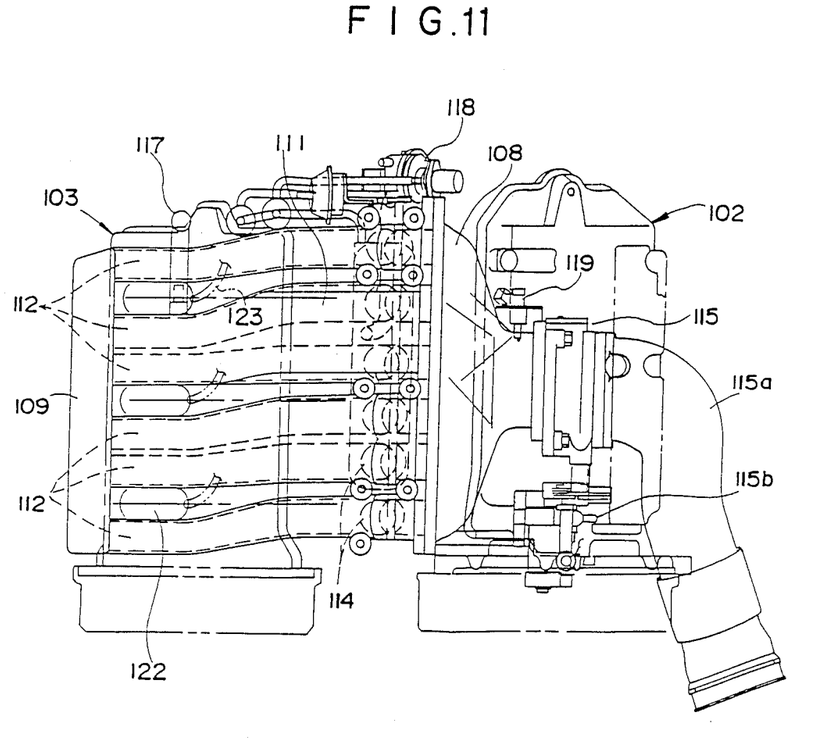
FIG. 11 is a plan view of the engine.
Figure 12:
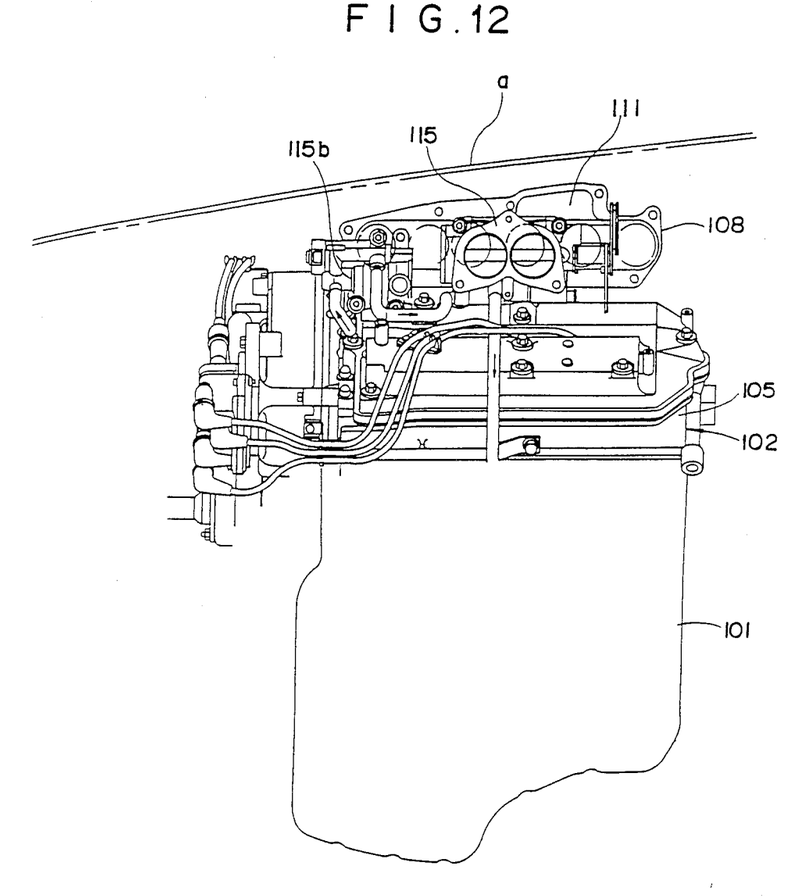
FIG. 12 is a side view of the engine.

FIGS. 8 and 9 show a modification of the first embodiment.

In this modification, the branch passages 9a to 9f which branch off from the discrete intake passages 6a to 6f are connected to a single volume chamber 45 which is formed separately from the upper half 7a of the intake manifold 7. The volume chamber 45 has an integral inner space 45a and all the branch passages 9a to 9f are communicated with the inner space 45a, whereby the discrete intake passages 6a to 6f are communicated with one another by way of the inner space 45a of the volume chamber 45. Each of the branch passages 9a to 9f is provided with the second on-off valve 16 at the junction to the volume chamber 45. The second on-off valves 16 for the respective branch passages 9a to 9f are fixed to a single shaft 46 and integrally driven by the second actuator 18.

In order to further improve the volumetric efficiency when the second on-off valves 16 are opened as described above, it is preferred that the cylinders be connected to the volume chambers so that the intake stroke does not occur successively in the cylinders connected to each volume chamber as in the first embodiment. However, cylinders in which the intake stroke occurs successively may be connected to a volume chamber as in the second embodiment or the modification of the first embodiment. Further, in the case where the branch passages are connected to separate volume chambers, the volume chambers need not be communicated with each other so long as each volume chamber can reflect the pressure wave which propagates through the branch passages.

Further, though, in the first embodiment, also the engine speed range in which the resonance supercharging effect can be obtained is changed by opening and closure of the first on-off valve 15 provided between the first and second chambers 8a and 8b of the surge tank 8, thereby supercharging the engine by the kinetic effect of intake air in a wider engine speed range, it is not necessarily needed. But the surge tank 8 may be arranged so that the resonance supercharging effect can be obtained just in a particular engine speed range.

FIGS. 10 to 13 show a third embodiment of the present invention.

In FIGS. 10 to 13, a V-type engine 101 has right and left cylinder heads 105 and 106 which respectively form right and left cylinder banks 102 and 103. Three cylinders 104 are formed in each cylinder head. Intake ports 107 are formed in the inner faces of the right and left cylinder heads 105 and 107. A first surge tank 108 extends in the longitudinal direction of the engine 101 above the right cylinder bank 102. A second surge tank 109 extends in the longitudinal direction of the engine 101 above the left cylinder bank 103.

The first surge tank 108 is connected to a throttle body 115 which will be described later. The first surge tank 108 is connected to each of the intake ports 107 by way of a high-engine-speed intake passage 110 whose effective length is short. The first surge tank 108 is communicated with the second surge tank 109 by way of a communicating passage 111 which extends across the space between the cylinder banks 2 and 3.

The second surge tank 109 is communicated with each intake port 107 by way of a low-engine-speed intake passage 112 which is relatively long is the effective length and is disposed below the communicating passage 111.

Each high-engine-speed intake passage 110 and each low-engine-speed intake passage 112 are merged together at the middle between the right and left cylinder banks 102 and 103, and then connected to the intake ports 107 in the right and left cylinder banks 102 and 103 by way of bifurcated pipe 113 . Each high-engine-speed intake passage 110 is provided with an on-off valve 114 at the junction thereof to the low-engine-speed intake passage 112. The shape and the position of the on-off valve 114 is selected so that it does not change the cross-sectional area of the low-engine-speed intake passage 112 and does not increase intake resistance in the low-engine-speed intake passage 112, thereby preventing torque shock from occurring in the low engine speed range where intake air is introduced into the cylinders through the low-engine-speed intake passage 112. For this purpose, the surface facing the intake port 107 may be of a concave surface having a large radius of curvature, for instance.

The distance from the middle between the cylinder banks 102 and 103 of the first surge tank 108 is shorter than that of the second surge tank 109. With this arrangement, the effective length of the high-engine-speed intake passage 110 can be made shorter, and a space remains above the right cylinder bank 103. Said throttle body 115 is disposed in the space above the right cylinder bank 103. Reference numeral 115a denotes a pipe which communicates the throttle body 115 to an air cleaner and is demountably mounted on the throttle body 115, and reference numeral 115b denotes an idle speed controller.

In the intake system of this embodiment, the on-off valves 14 are closed and the high-engine-speed intake passages 110 are closed in the low engine speed range, and intake air first flows into the first surge tank 108 through the throttle body 115 and then into each cylinder 4 through the communicating passage 111, the second surge tank 109 and the low-engine-speed intake passage 112.

That is, in the low engine speed range, the first and second surge tanks 108 and 109 function as a large surge tank having the volume equal to the sum of their volumes, and accordingly, a satisfactory inertia supercharging effect can be obtained.

In the high engine speed range, the on off valves 14 are opened and the high-engine-speed intake passages 110 are opened. Accordingly, the major part of intake air is introduced into each cylinder 4 through the high-engine-speed intake passage 110 which is short in the effective length, though a part of the intake air is introduced into each cylinder 4 through the low-engine-speed intake passages 112.

Since the first surge tank 108 is toward the middle between the cylinder banks 102 and 103 and the throttle body 115 is disposed in the space above the right cylinder bank 103, the part of the intake system upstream of the first surge tank 108 including the throttle body 115 and the air cleaner can be made short, whereby positioning of the part of the intake system is facilitated and the part can be copactly arranged. Further the appearance of the inside of the engine room is improved, and the engine becomes easy to assemble and to maintain.

Further, since part of the intake system upstream of the first surge tank 108 can be shortened and the high-engine-speed intake passages 110 can be shortened, the intake resistance can be substantially reduced in the high engine speed range and accordingly the volumetric efficiency in the high engine speed range can be substantially improved.

The cross-sectional area of the first surge tank 108 gradually increases from the intake air inlet on the side of the throttle body 115 toward the downstream side along the flow line of intake air, whereby intake air can be more evenly distributed to the cylinders in the high engine speed range.

The communicating passage 111 which is positioned highest in the intake system is disposed toward the rear side of the first and second surge tanks 108 and 109. Since the engine hood line is generally inclined downward toward the front of the vehicle body as shown by chain a line in FIG. 12, this arrangement of the communicating passage 111 conforms to the requirement of lowering the engine hood line.

An EGR passage 116 and a blow-by gas passage 117 is connected to the communicating passage 111. The EGR passage 116 is led from an EGR valve 118 and is connected to an upstream side portion of the communicating passage 111. The blow-by gas passage 117 is led from the left cylinder head 106 and is connected a downstream side portion of the communicating passage 111. With this arrangement, the EGR gas and the blow-by gas flow through a long passage including the communicating passage 111, the second surge tank 109 and the low-engine-speed intake passage 112, and accordingly the gasses are sufficiently mixed with air and uniformly distributed to the cylinders 4.

Further, when the EGR gas passage 117 is connected to the communicating passage 111 upstream of the blow-by gas passage 116, the EGR gas which can adversely affect emission can be sufficiently mixed with air and at the same time, the oil component in the blow-by gas cannot stick to the opening of the EGR gas passage 117. A cold-start injector 119 is provided in the passage between the throttle valve in the throttle body and the first surge tank 108. When the cold-start injector 119 is in such a position, the fuel injected from the injector during cold-start flows togther with intake air over a long passage including the first surge tank 108, the communicating passage 111, the second surge tank 109 and the low-engine-speed intake passage 112 before it enters the cylinder, and accordingly it can be sufficiently mixed with air and uniformly distributed to the cylinders 4.

Figure 13:
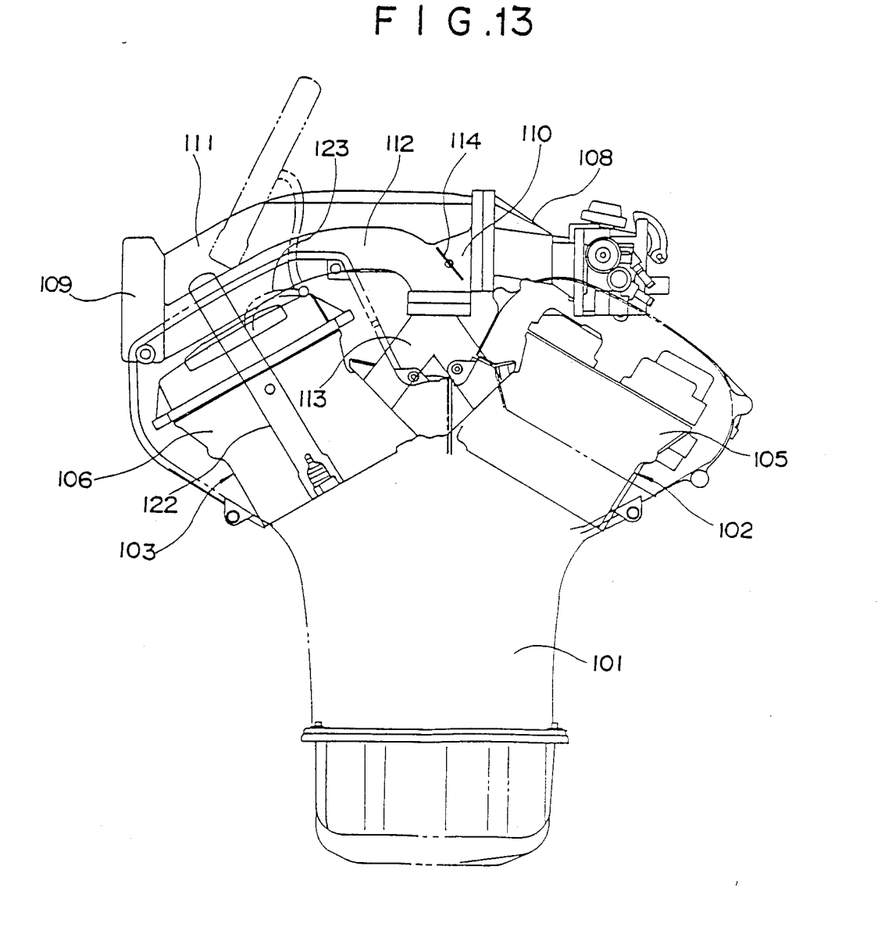
FIG. 13 is a cross-sectional view of the engine.

A vacuum chamber 121 which functions as a negative pressure reservoir for a brake masterback or the like is connected to the bifurcated pipe 113 by way of a check valve 120 which is opened and closed according to the intake vacuum. The vacuum chamber 121 is disposed in a space defined by the upper portion of the cylinder heads and the bifurcated pipes 113. With this arrangement, the vacuum chamber 121 can be disposed while making the best use of the upper portion of the space between the cylinder banks 102 and 103. Further, since the vacuum chamber 121 can be positioned close to the cylinders 4 which are negative pressure sources, the vacuum chamber 121 can store a large negative pressure. Further, the arrangement can contribute toward in compactly arranging the vacuum chamber 121 and the brake masterback.

The intake manifold which forms the low-engine-speed intake passage 112 does not occupy the space above the spark plug mounting position for each cylinder 4 in the left cylinder bank 103, and a plug cap 122 is inserted into the space. A high-tension code 123 which is integrally connected to each plug cap 122 is fixed to the cylinder head cover on the left cylinder head 106.

We claim

1. An intake system for a V-type engine having a plurality of cylinders formed in a pair of cylinder banks comprising a first volume chamber which is communicated with the atmosphere through a common intake passage, at least one throttle valve provided upstream of said first volume chamber to control flow from said common intake passage, discrete intake passages which branch off from the volume chamber and are connected to the respective cylinders, branch passages which branch off from the respective discrete intake passages, one or more second volume chambers each of which is communicated with at least two of the branch passages, on-off valves which are respectively provided in the branch passages and are opened and closed according to the operating condition of the engine, said first volume chamber being disposed above one of the cylinder banks and said second volume chamber or second volume chambers being disposed above the other cylinder bank.

2. An intake system as defined in claim 1 which is provided with pair of said second volume chambers extends in the direction parallel to the row of the cylinders.

3. An intake system as defined in claim 2 in which said second volume chambers are positioned on a level with each other.

4. An intake system as defined in claim 2 in which the branch passages communicated to the cylinders in which the intake stroke occurs successively are connected to each of the second volume chambers.

5. An intake system as defined in claim 2 in which said second volume chambers are positioned so that they overlap with each other in the vertical direction.

6. An intake system as defined in claim 2 in which the branch passages communicated to the cylinders in which the intake stroke do not occur successively are connected to each of the second volume chamber.

7. An intake system as defined in claim 1 which is provided with a single second volume chamber and all the branch passages are connected to the single second volume chamber.

8. An intake system as defined in claim 1 in which said on-off valves are provided in the respective branch passages at their junctions to the second volume chamber.

9. An intake system as defined in claim 1 in which said first volume chamber has a pair of chambers which are communicated with each other by way of an opening and an additional on-off valve is provided in the opening and opens and closes the opening according to the operating condition of the engine.

10. An intake system as defined in claim 9 in which the discrete intake passages communicated to the cylinders in which the intake stroke do not occur successively are connected to each of the chambers of the first volume chamber.

11. An intake system as defined in claim 1 in which said first volume chamber is communicated with the second volume chamber by way of a communicating passage and a throttle body in which said throttle valve is disposed is connected to the first volume chamber, the first and second volume chambers being arranged so that intake air flows therethrough over the entire engine speed range and they function as surge tanks.

12. an intake system as defined in claim 11 in which said communicating passage is disposed above said discrete intake passages.

13. An intake system as defined in claim 11 in which said first volume chamber is disposed toward the middle between the cylinder banks, and the throttle body is disposed on the outer side of the first volume chamber above said one of the cylinder banks.

* * * * *